J. A. SIMPSON.
FASTENER.
APPLICATION FILED FEB. 5, 1908.
941,542.
Patented Nov. 30, 1909.
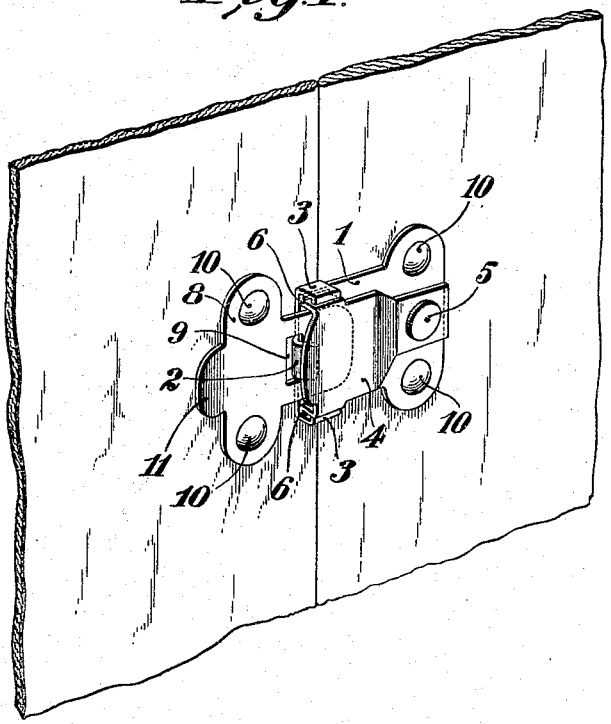
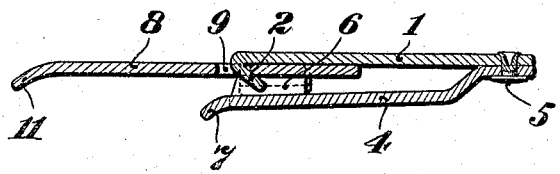
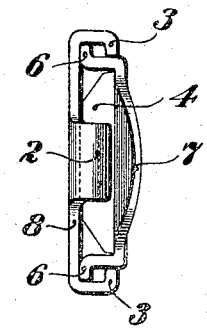
Witnesses:
Inventor:
John A. Simpson
by his Attorneys
Phillips Van Everen & Fish

UNITED STATES PATENT OFFICE.

JOHN A. SIMPSON, OF SOMERVILLE, MASSACHUSETTS.

FASTENER.

941,542.　　　　　Specification of Letters Patent.　　Patented Nov. 30, 1909.

Application filed February 5, 1908. Serial No. 414,317.

*To all whom it may concern:*

Be it known that I, JOHN A. SIMPSON, a citizen of the United States, residing at Somerville, in the county of Middlesex and State of Massachusetts, have invented certain new and useful Improvements in Fasteners; and I do hereby declare the following to be a full, clear, and exact description of the invention, such as will enable others skilled in the art to which it appertains to make and use the same.

The present invention relates to separable fasteners and particularly to that class of separable fasteners in which the parts are engaged and disengaged by a relative lateral sliding movement.

The present invention is designed particularly for use on oil-cloth coats or other water proof garments but is also capable of use in other relations.

The object of the present invention is to produce a strong and durable fastener of the class referred to, composed of a small number of parts, which are inexpensive to manufacture, which can be readily formed and assembled, which can be conveniently manipulated to cause the parts to become engaged and disengaged, and which when engaged will be securely held from disengagement under all conditions of use.

With the above object in view the present invention consists in the improved fastener hereinafter described and claimed.

The present invention will be clearly understood from an inspection of the accompanying drawings in which—

Figure 1 is a perspective view of a fastener embodying the same in its preferred form. Fig. 2 is a longitudinal central sectional view of the fastener and Fig. 3 is an end view of the socket portion of the fastener.

The fastener illustrated in the drawings consists of a socket portion and a tongue portion. The socket portion comprises a base plate provided at its forward end with a projection or hook and a leaf spring riveted to the base plate at its rear end and projecting at its forward end over the projection on the base. At their forward ends the base plate and the leaf spring are provided with coöperating ears which limit the movement of the spring away from the plate. The tongue portion of the fastener is of such shape that it can slide between the plate and the spring of the socket portion and is provided with an opening to receive the projection or hook on the base plate. In the construction illustrated the ears on the leaf spring are separated from each other a distance slightly greater than the width of the tongue so that the ears act as guides for the tongue when the tongue is inserted in the socket portion of the fastener. To permit the tongue to be more readily inserted in the socket portion of the fastener the forward end of the leaf spring is bent upwardly so that the projection on the base and the forward end of the leaf spring present a flaring opening to receive the end of the tongue.

The base plate of the socket portion of the fastener illustrated in the drawing is indicated at 1 and consists of a flat sheet of metal provided at its forward end with an upwardly and rearwardly bent projection or hook 2 and provided at each side near its forward end with an upwardly and inwardly bent ear 3. The leaf spring of the socket portion of the fastener is indicated at 4 and is secured to the base plate 1 at its rear end by means of a rivet 5. The leaf spring extends forward over the projection 2 of the base plate and is offset, as best shown in Fig. 2, so that for the greater portion of its length it extends substantially parallel with the base plate. The leaf spring normally rests upon the projection 2 of the base plate or extends in close proximity thereto so as to form a guard to prevent the tongue portion of the fastener from accidentally becoming disengaged from the projection. To permit the tongue of the fastener to be disengaged from the projection 2 of the socket portion the spring 4 must be forced away from the base 1, and to limit this movement of the spring it is provided at each side near its forward end with downwardly and outwardly bent ears 6 which coöperate with the ears 3 on the base plate. The forward end of the leaf spring 4 is bent upwardly as indicated at 7 so that this portion of the spring in connection with the projection 2 present a flaring opening to receive the end of the tongue portion of the fastener.

The tongue portion of the fastener is indicated at 8 and consists of a sheet metal plate of the shape illustrated in Fig. 1 provided with an opening 9 to receive the projection or hook 2 of the socket portion. The part of the tongue portion of the fastener which enters the socket portion is slightly less in width than the distance between the ears 6 on the leaf spring 4 so that these ears guide the tongue when it is inserted in the socket portion of the fastener. The tongue portion of the fastener and the base plate of the socket portion are provided with perforations to receive the rivets 10 by means of which the parts of the fastener are secured to a garment as illustrated in Fig. 1, and the tongue portion of the fastener at its rear end is bent upwardly as indicated at 11 to enable the fastener to be more readily manipulated when the parts are to be engaged or disengaged.

In using the fastener illustrated in the drawing the forward end of the tongue is inserted into the flaring opening formed by the projection 2 and the upwardly bent end of the leaf spring 4 and is forced in over the projection until the projection enters the opening in the tongue, the tongue in this movement being guided by the ears on the leaf spring. To disengage the tongue the rear portion of the tongue is lifted, while the forward end of the tongue is pressed against the base plate 1, until the tongue engages the leaf spring and forces it away from the base plate sufficiently to enable the opening in the tongue to be disengaged from the projection on the base plate when the tongue is removed. In this operation of separating the two parts of the fastener the tongue acts as a lever to force the spring away from the base plate and the ears 3 and 6 coöperate to limit the movement of the spring.

The invention having been described, what is claimed is:—

A separable fastener, having, in combination, a base plate provided with a projection, a leaf spring secured to the base plate and extending over the projection to form a guard, and a tongue provided with an opening to receive the projection arranged to slide between the projection and the spring, said plate and spring being provided with ears coöperating to limit the movement of the spring away from the plate.

In testimony whereof I affix my signature, in presence of two witnesses.

JOHN A. SIMPSON.

Witnesses:
FRED O. FISH,
CHARLES W. MCDERMOTT.